(12) United States Patent
Nomizo (10) Patent No.: US 8,559,522 B2
(45) Date of Patent: Oct. 15, 2013

(54) IMAGE/SOUND SUPPLY DEVICE, IMAGE/SOUND SUPPLY SYSTEM, IMAGE/SOUND SUPPLY METHOD, AND IMAGE/SOUND SUPPLYING PROGRAM

(75) Inventor: Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 939 days.

(21) Appl. No.: 12/684,218

(22) Filed: Jan. 8, 2010

(65) Prior Publication Data

US 2010/0232514 A1  Sep. 16, 2010

(30) Foreign Application Priority Data

Mar. 12, 2009  (JP) .................... 2009-059494

(51) Int. Cl.
*H04B 1/66* (2006.01)
*G06F 17/00* (2006.01)

(52) U.S. Cl.
USPC ........................ 375/240.24; 700/94

(58) Field of Classification Search
USPC ......... 348/448, 460, 467, 478, 731, 734, 563, 348/564, 569, 561, 406, 461, 725; 375/240.01–240.29; 700/94
See application file for complete search history.

(56) References Cited

U.S. PATENT DOCUMENTS

2010/0067877 A1* 3/2010 Ichimura et al. ............. 386/96
2012/0229704 A1* 9/2012 Suzuki ........................ 348/554

FOREIGN PATENT DOCUMENTS

| JP | 08-195947 A | 7/1996 |
| JP | 2001-094980 A | 4/2001 |
| JP | 2001-358799 A | 12/2001 |
| JP | 2002-329372 A | 11/2002 |
| JP | 2003-050694 A | 2/2003 |
| JP | 2004-088194 A | 3/2004 |

* cited by examiner

*Primary Examiner* — Behrooz Senfi
(74) *Attorney, Agent, or Firm* — ALG Intellectual Property, LLC (57) ABSTRACT

An image/sound supply device repeatedly supplying sound data and image data in such a manner that intervals between transmission start points of the sound data become constant, includes: a block data extraction section extracting first block data including data with a difference between two frame images with a time lag; a block data dividing section dividing the first block data into second block data with a data amount equal to or smaller than a second data amount when a data amount of the first block data is larger than the second data amount; a sound data output section outputting the sound data with a first data amount; and a block data output section outputting the first block data subsequently to the sound data when the first block data is not divided, and outputting the second block data subsequently to the sound data when the first block data is divided.

8 Claims, 9 Drawing Sheets

| 5a | 5b | 5c | 5d |
|---|---|---|---|
| STARTING COORDINATE VALUE | BLOCK SIZE | DATA SIZE | BLOCK DATA |

TRANSMISSION ORDER (UNIT: byte)

| | |
|---|---|
| SOUND DATA | 1125 |
| BLOCK DATA B1a | 998875 |
| SOUND DATA | 1125 |
| BLOCK DATA B1c | 998875 |
| SOUND DATA | 1125 |
| BLOCK DATA B1b<br>BLOCK DATA B1e | 580261<br>382456 } 962717 |
| SOUND DATA | 1125 |
| BLOCK AREA B2<br>BLOCK DATA B1f | 773462<br>180392 } 953854 |
| SOUND DATA | 1125 |
| BLOCK AREA B3 | 862464 |
| SOUND DATA | 1125 |
| BLOCK DATA B1d | 654397 |

IMAGE/SOUND SUPPLY DEVICE, IMAGE/SOUND SUPPLY SYSTEM, IMAGE/SOUND SUPPLY METHOD, AND IMAGE/SOUND SUPPLYING PROGRAM

CROSS-REFERENCE

The present application claims priority from Japanese Patent Application No. 2009-059494 filed on Mar. 12, 2009, which is hereby incorporated by reference in its entirety.

BACKGROUND

There is known a technology that, in a projector system having a personal computer (PC) and a projector for projecting and thereby displaying an image connected to each other via a Universal Serial Bus (USB) cable, the PC supplies the projector with image data, and then the projector projects and thereby displaying the image (see, e.g., Japanese Patent Publication No. 2004-88194).

Further, the applicant of the invention has put the projector system into practical use, in which the PC and the projector are connected to each other via the USB cable, the PC supplies the projector with image data and sound data, and the projector projects and thereby displaying the image, and at the same time outputs the sound from a speaker incorporated in the projector. More specifically, in the projector system, the PC transmits the digital data of the image to be displayed and of the sound to be output, to the projector via the USB cable in accordance with the process of an operating system and an application program by the central processing unit (CPU) of the PC itself. Then, the projector receives the digital signal, converts it into an image signal and a sound signal, and then performs the display by projection and the sound output from the speaker. Since in this projector system the conventional connection environment using a plurality of signal cables such as an RGB cable and an audio cable can be changed to the connection environment using a single USB cable, the burden of the complicated connection operation can be reduced, and at the same time, the image and the sound can be communicated between the devices as the digital data, and thus the scalability of the system can be enhanced.

In the image/sound supply technology described above, in order for reducing the processing load on each of the PC and the projector, and for reducing the amount of data transmitted between the devices, it is arranged that rectangular areas including portions with movement between the frame images are extracted from the image data, and then the data of the rectangular areas are transmitted. Further, in order for making it easy for the projector to synchronize the image and the sound with each other, it is arranged to transmit the data of the rectangular areas and the sound data alternately. In this case, in order for preventing the sound interruption from occurring in the reproduction of the sound in the projector, it is desirable for the PC to transmit a predetermined amount of sound data enough for preventing the lack of data in the sound processing in the projector at predetermined intervals. However, in the case in which the area with motion between the frames is large, and therefore, the amount of data of the rectangular area thus extracted becomes larger, it is caused that the time necessary for transmitting the data of the rectangular area exceeds the transmission intervals, and in this case, the sound interruption should be caused in the reproduction of the sound by the projector.

Here, it is conceivable that if the maximum amount of data of the rectangular area, which can be supplied at a time, is set to be equal to or smaller than the amount of data, which can be transmitted within one cycle of the sound data, and the PC controls the data of the rectangular area to be transmitted to be equal to or smaller than the maximum amount of data, the sound interruption in the projector can be prevented from occurring. However, since in the case in which the data of a plurality of rectangular areas with amounts of data different from each other are transmitted alternately with the sound data, there might be caused wait time between a period from when the data of the rectangular area has been transmitted to when the transmission of the sound data to be transmitted subsequently is started, the overall transmission efficiency might be degraded.

SUMMARY

Various embodiments may provide an image/sound supply device, an image/sound supply system, an image/sound supply method, and an image/sound supplying program each capable of efficiently supplying image data, thereby prevent the sound interruption in the sound reproduction in a supply destination in the case of supplying the image data and the sound data as digital data from a supply source to the supply destination.

According to at least one embodiment of the disclosure, there is provided an image/sound supply device adapted to repeatedly supply sound data and image data in such a manner that intervals between transmission start points of the sound data become constant, including, a block data extraction section adapted to extract first block data including data with a difference between two frame images with a time lag, a block data dividing section adapted to divide the first block data into second block data with a data amount equal to or smaller than a second data amount when a data amount of the first block data extracted is larger than the second data amount, a sound data output section adapted to output the sound data with a first data amount, and a block data output section adapted to output the first block data subsequently to output of the sound data from the sound data output section when the block data dividing section skips dividing the first block data, and to output the second block data as much as a data amount equal to or smaller than the second data amount subsequently to the output of the sound data from the sound data output section when the block data dividing section divides the first block data.

According to at least one embodiment of the disclosure, in the image/sound supply device of the above embodiment, the block data dividing section divides the first block data into a plurality of the second block data respectively having data amounts each of which is equal to or smaller than the second data amount and which are different in stages when the data amount of the first block data is larger than the second data amount, and the block data output section outputs the first block data subsequently to the output of the sound data from the sound data output section when the block data dividing section skips dividing the first block data, and combines some or all of the plurality of the second block data so that a total data amount becomes equal to or smaller than the second data amount, and outputs the second block data combined subsequently to the output of the sound data from the sound data output section when the block data dividing section divides the first block data into the plurality of the second block data.

According to at least one embodiment of the disclosure, there is provided an image/sound supply system including an image/sound supply device, and an image/sound output device connected to the image/sound supply device via a data bus, wherein the image/sound supply system is adapted to repeatedly supply the image/sound output device with sound data and image data in such a manner that intervals between transmission start points of the sound data become constant, the image/sound supply device includes a block data extraction section adapted to extract first block data including data with a difference between two frame images with a time lag, a block data dividing section adapted to divide the first block data into second block data with a data amount equal to or smaller than a second data amount when a data amount of the first block data extracted is larger than the second data amount, a sound data output section adapted to output the sound data with a first data amount, and a block data output section adapted to output the first block data as block data subsequently to output of the sound data from the sound data output section when the block data dividing section skips dividing the first block data, and to output the second block data as much as a data amount equal to or smaller than the second data amount as the block data subsequently to the output of the sound data from the sound data output section when the block data dividing section divides the first block data, and the image/sound output device includes a sound data receiving section adapted to receive the sound data supplied from the image/sound supply device, a sound output section adapted to convert the sound data received into a sound signal, and to perform sound output, a frame image storage section adapted to store the frame image, a block data receiving section adapted to receive the block data output from the image/sound supply device, a block data overwrite control section adapted to overwrite the block data received on the frame image stored in the frame image storage section, and a projection output section adapted to retrieve the frame image stored in the frame image storage section in an overwriting manner, and to perform projection output.

According to at lest one embodiment of the disclosure, in the image/sound supply system of the above embodiment, in the image/sound supply device, the block data dividing section divides the first block data into a plurality of the second block data respectively having data amounts each of which is equal to or smaller than the second data amount and which are different in stages when the data amount of the first block data is larger than the second data amount, and the block data output section outputs the first block data as the block data subsequently to the output of the sound data from the sound data output section when the block data dividing section skips dividing the first block data, and combines some or all of the plurality of the second block data so that a total data amount becomes equal to or smaller than the second data amount, and outputs the second block data combined as the block data subsequently to the output of the sound data from the sound data output section when the block data dividing section divides the first block data into the plurality of the second block data.

According to at least one embodiment of the disclosure, there is provided an image/sound supply method adapted to repeatedly supply sound data and image data in such a manner that intervals between transmission start points of the sound data become constant, including the steps of (a) extracting a first block data including data with a difference between two frame images with a time lag, (b) dividing the first block data into second block data with a data amount equal to or smaller than a second data amount when a data amount of the first block data extracted is larger than the second data amount, (c) outputting the sound data with a first data amount, and (d) outputting the first block data subsequently to output of the sound data in step (c) when dividing of the first block data is skipped in step (b), and outputting the second block data as much as a data amount equal to or smaller than the second data amount subsequently to the output of the sound data in step (c) when the first block data is divided in step (b).

According to at least one embodiment of the disclosure, in the image/sound supply method of the above embodiment, in step (b), the first block data is divided into a plurality of the second block data respectively having data amounts each of which is equal to or smaller than the second data amount and which are different in stages when the data amount of the first block data is larger than the second data amount, and in step (d), the first block data is output subsequently to the output of the sound data in step (c) when dividing of the first block data is skipped in step (b), and some or all of the plurality of the second block data is combined so that a total data amount becomes equal to or smaller than the second data amount, and the second block data combined is output subsequently to the output of the sound data in step (c) when the first block data is divided into the plurality of the second block data in step (b).

According to at least one embodiment of the disclosure, there is provided an image/sound supplying program for making a computer execute a process of repeatedly supplying sound data and image data in such a manner that intervals between transmission start points of the sound data become constant, the process including the steps of (a) extracting a first block data including data with a difference between two frame images with a time lag, (b) dividing the first block data into second block data with a data amount equal to or smaller than a second data amount when a data amount of the first block data extracted is larger than the second data amount, (c) outputting the sound data with a first data amount; and (d) outputting the first block data subsequently to output of the sound data in step (c) when dividing of the first block data is skipped in step (b), and outputting the second block data as much as a data amount equal to or smaller than the second data amount subsequently to the output of the sound data in step (c) when the first block data is divided in step (d).

According to at least one embodiment of the disclosure, in the image/sound supplying program of the above embodiment, in step (b), the first block data is divided into a plurality of the second block data respectively having data amounts each of which is equal to or smaller than the second data amount and which are different in stages when the data amount of the first block data is larger than the second data amount, and in step (d), the first block data is output subsequently to the output of the sound data in step (c) when dividing of the first block data is skipped in step (b), and some or all of the plurality of the second block data is combined so that a total data amount becomes equal to or smaller than the second data amount, and the second block data combined is output subsequently to the output of the sound data in step (c) when the first block data is divided into the plurality of the second block data in step (b).

According to the above embodiments, since the sound data can be transferred at regular intervals, on the output side of the image and the sound, the sound can stably be output without causing the sound interruption. Moreover, in addition thereto, since the image data can efficiently be transmitted on the supply side of the image data, the data transfer with extremely high transfer efficiency can be performed as a whole system.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENT

Figure 1:
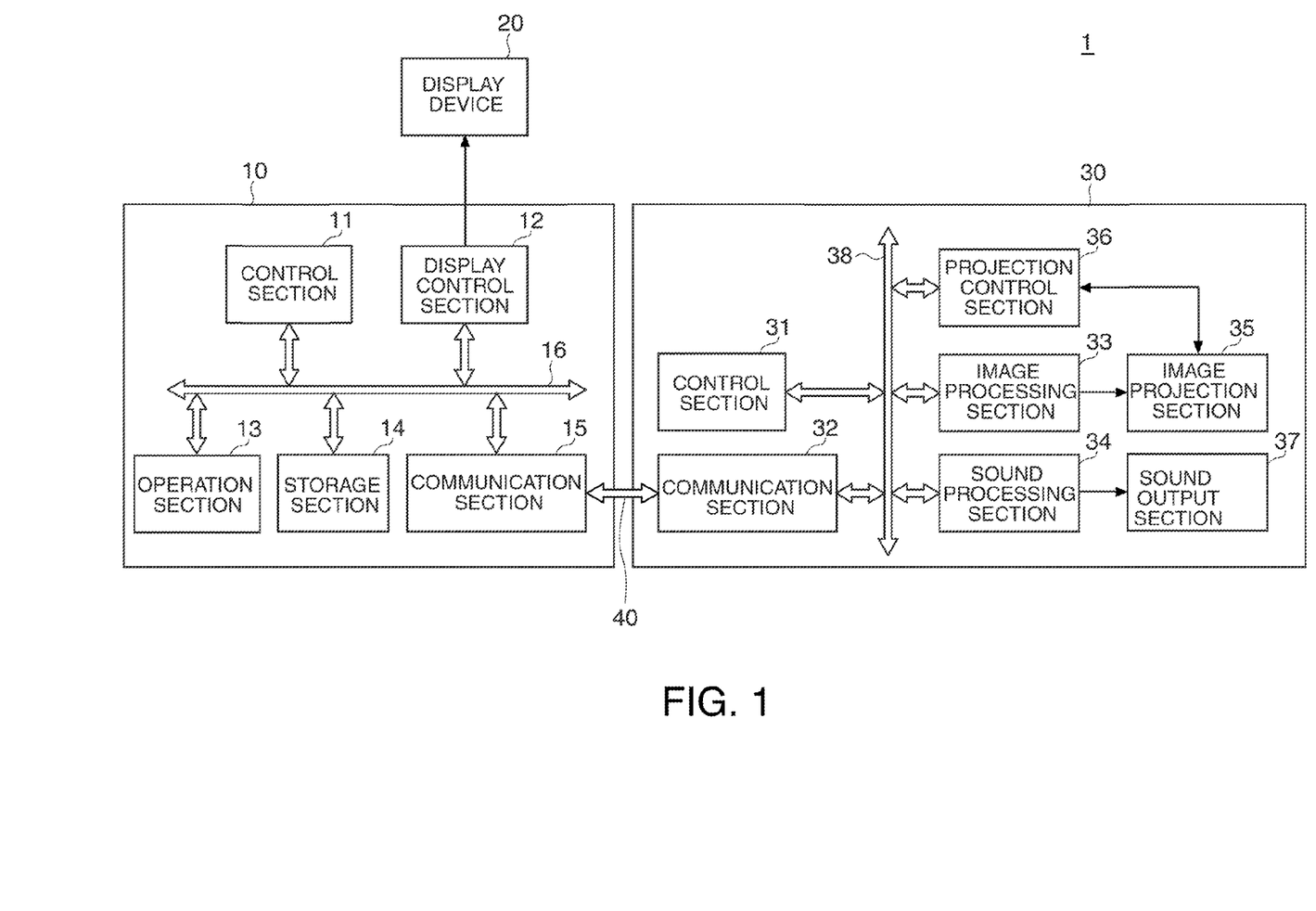
FIG. 1 is a configuration diagram of a projector system to which an image/sound supply system as an embodiment of the invention is applied.

An embodiment will hereinafter be described in detail with reference to the accompanying drawings. FIG. 1 shows a configuration diagram of a projector system to which an image/sound supply system as an embodiment of the invention is applied. In FIG. 1, the projector system 1 is provided with a personal computer (PC) 10 as an image/sound supply device, a display device 20 for displaying information related to execution of an operating system (OS) and an application program by the PC 10, and a projector 30 as an image/sound output device. Further, the PC 10 and the projector 30 are connected to each other via a USB cable 40. Further, the display device 20 is connected to the PC 10. It should be noted that the PC 10 and the display device 20 can also be configured integrally as in the case of a typical laptop computer.

In FIG. 1, the PC 10 is provided with a control section 11, a display control section 12, an operation section 13, a storage section 14, and a communication section 15, and these constituents are connected functionally to each other via a bus 16. The control section 11 is a processing section for controlling an overall process of the PC 10, and is composed mainly of a CPU, a RAM, and a ROM, all not shown. The control section 11 loads the OS and the application program, which are stored in the storage section 14, on the RAM, and executes them, thereby controlling the entire PC 10. For example, when the control section 11 loads the application program for presentation stored in the storage section 14, and then executes it, the PC 10 operates as a presentation device. Further, by loading the image/sound supplying program, which is stored in the ROM or stored in the storage section 14, on the RAM and then executing it, the control section 11 optimizes the data configuration of the sound data, which is output by the PC 10 executing the OS and the application program, and the image data, which is made to be displayed, so that the transfer efficiency is kept at a high level, and then outputs them from the communication section 15. This process of optimizing the data configuration will be described later in detail.

Under the control of the control section 11, the display control section 12 stores the display information to be displayed on the display device 20 in an image memory not shown as the frame data. Subsequently, the display control section 12 retrieves the frame data from the image memory, converts it into an image signal (e.g., an RGB signal), and then output the signal. The operation section 13 is an input section for allowing the operator of the PC 10 to perform input operations, and is provided with a keyboard and a pointing device such as a mouse. The storage section 14 is for storing the OS and the application programs, as described above. Further, the storage section 14 stores the sound data used in processing the OS and the application programs. The sound data can be either one of non-compressed data and compressed data. For example, pulse code modulation (PCM) data can be used as the non-compressed sound data, and MPEG audio layer-3 (MP3) data can be used as the compressed sound data.

The communication section 15 is an interface section, compliant with the USB standard, for communicating digital data with the projector 30 to be a client side, is provided with a USB connector (for host devices) to be connected to the USB cable 40. The communication section 15, under the control of the control section 11, is set to be in a mode corresponding to either one of the USB 1.1 standard with the maximum transfer rate of 12 Mbps and the USB 2.0 standard with the maximum transfer rate of 480 Mbps, and operates in the mode thus set.

In FIG. 1, the projector 30 is provided with a control section 31, a communication section 32, an image processing section 33, a sound processing section 34, an image projection section 35, a projection control section 36, and a sound output section 37, and among them, the control section 31, the communication section 32, the image processing section 33, the sound processing section 34, and the projection control section 36 are connected functionally to each other via a bus 38. The control section 31 is a processing section for controlling an overall process of the projector 30, and is composed mainly of a CPU, a RAM, and a ROM, all not shown. By retrieving and then executing an image/sound receiving program stored in the ROM, the control section 31 can make the projector 30 receive the image data and the sound data transferred from the PC 10 and perform image processing and sound processing, thereby projecting an image and outputting a sound. The control section 31 stores the image data and the sound data received in the communication section 32 into the RAM, supplies the image processing section 33 with the image data among the data thus stored, and supplies the sound processing section 34 with the sound data among the data.

The communication section 32 is an interface section compliant with the USB standard similarly to the case of the communication section 15 of the PC 10, and is provided with the USB connector (for client devices) to be connected to the USB cable 40. The communication section 32 performs negotiation of the communication with the PC 10 as the host side, and is set in the transfer mode identical to the transfer mode in which the communication section 15 of the PC 10 is set, and operates in that mode.

The image processing section 33 forms the frame image based on the image data supplied from the RAM under the control of the control section 31, and supplies the image projection section 35 with the frame image. The image processing section 33 is provided with a frame memory corresponding to at least one frame, and forms a new frame image by overwriting the image data supplied from the RAM on the frame memory storing the previous frame image. The image projecting section 35 is provided with a light source, a liquid crystal light valve, and a lens all not shown, and inputs the frame data supplied from the image processing section 33 into the liquid crystal light valve to display the frame data thereon, and applies the light emitted from the light source to the liquid crystal light valve, thereby projecting and thus displaying the frame image, which is displayed on the liquid crystal light valve, on an external projection screen via the lens. Under the control of the control section 31, the projection control section 36 controls the operations of the light source and the liquid crystal light valve of the image projection section 35.

The sound processing section 34 converts the sound data supplied from the RAM under the control of the control section 31 into a sound signal, and supplies the sound output section 37 with the sound signal. The sound output section 37 is provided with an amplifier and a speaker both not shown, and amplifies the sound signal with the amplifier, and then outputs the sound from the speaker in an amplified manner.

Figure 2:
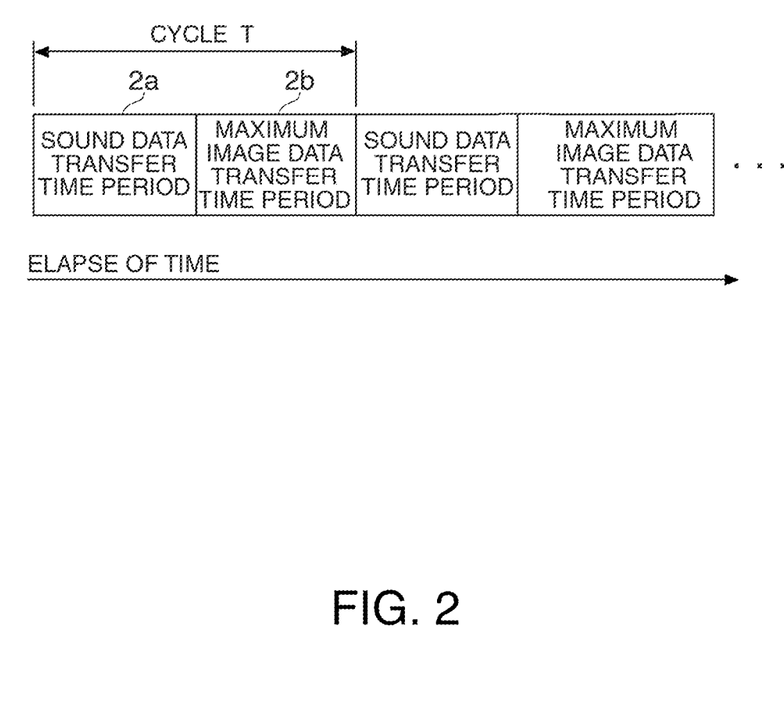
FIG. 2 is a data transfer time chart for explaining the procedure of transfer of the image data and the sound data to be transferred from a personal computer to a projector.

Then, a procedure of the transfer of the image data and the sound data to be transferred from the PC 10 to the projector 30 will be explained with reference to a data transfer time chart shown in FIG. 2. In FIG. 2, sound data transfer time period 2a is a time period provided for transferring the sound data, and maximum image data transfer time period 2b is the maximum time period provided for transferring the image data. As shown in FIG. 2, the sound data transfer time period 2a and the maximum image data transfer time period 2b are provided alternately. Further, the sound data is transferred with a cycle T, namely the total time of the sound data transfer time period 2a and the maximum image data transfer time period 2b, and the image data is transferred within the maximum image data transfer time period 2b subsequently to the transfer of the sound data.

Then, details of the image data to be transferred by the PC 10 will be explained. In the present embodiment, the image data transferred to the projector 30 is the data (a first block data) of a rectangular area of the frame image switched at a predetermined frame rate (e.g., 30 fps) including the data with a difference between the contiguous frames. In other words, the display control section 12 stores the frame images corresponding to at least two contiguous frames in the image memory, and the control section 11 compares the data of one frame image stored in the image memory with the data of the other frame image as the comparison object to detect the data with the difference, and extracts the data of the rectangular area including the data thus detected, as the image data to be transferred to the projector 30. It should be noted that the control section 11 can be arranged to compare the frame images several frames distant from each other. If the image memory has the capacity sufficient for storing the frame images corresponding to the several frames, the distance between the frame images to be compared can be adjusted within the several frames.

Figure 3:
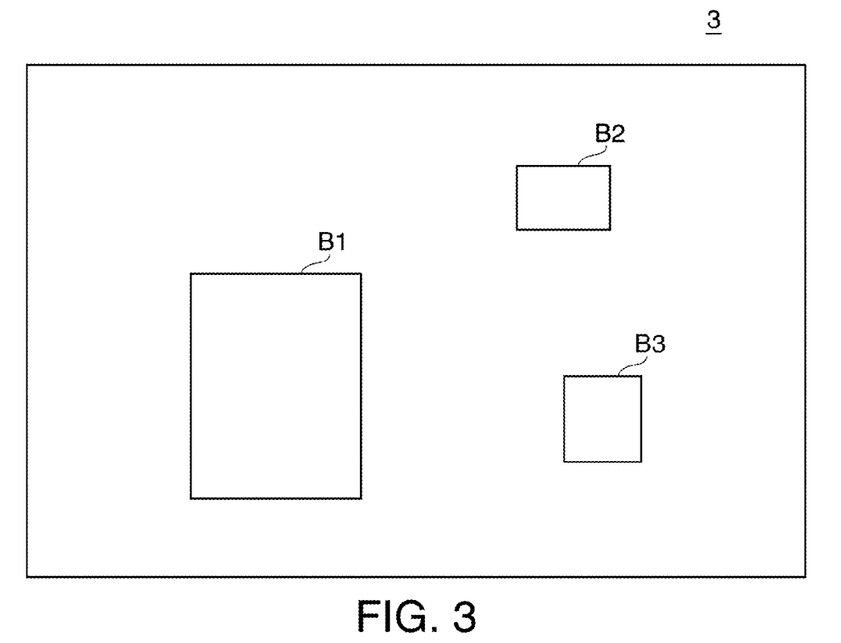
FIG. 3 is a diagram schematically showing rectangular areas extracted between a frame image at a certain time point and the subsequent frame image.

FIG. 3 schematically shows rectangular areas extracted between a frame image at a certain time point and the subsequent frame image. FIG. 3 shows the frame image 3 expressing that block areas B1, B2, and B3 each including the data with the difference are extracted. In the case of the frame image 3 shown in FIG. 3, it is required to transfer the block areas B1, B2, and B3 within one or repeated plural maximum image data transfer time periods 2b shown in FIG. 2. Therefore, in the present embodiment, the PC 10 calculates the maximum data size of the image data which can be transferred within the maximum image data transfer time period 2b, divides each of the block areas B1, B2, and B3 into block data (second block data) with a size equal to or smaller than the maximum data size, and then transfers the block data.

Figure 4:
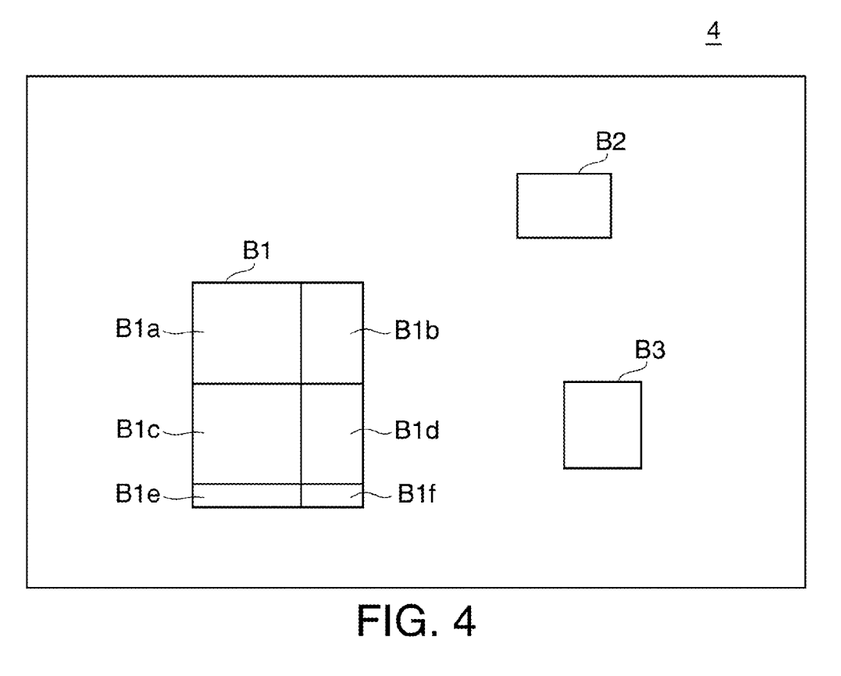
FIG. 4 is a diagram schematically showing an appearance in the case in which the rectangular area including the data with difference between the frame images is divided into block data having a size equal to or smaller than the maximum data size.

FIG. 4 schematically shows an appearance in the case in which the block area B1, B2, and B3 are divided into block data having a size equal to or smaller than the maximum data size. FIG. 4 shows the fact that the block area B1 of the frame image 4 is divided into the block data B1a, B1b, B1c, B1d, B1e, and B1f. Here, it is assumed that the block data B1a, B1c are the block data with the maximum data size. Since the block areas B2, B3 each have a data size S smaller than the maximum data size, it is assumed that they are treated as the block data without the block division performed thereon. The relationship in data size S between the eight block data is assumed to satisfy the following inequity expression.

Figure 5:
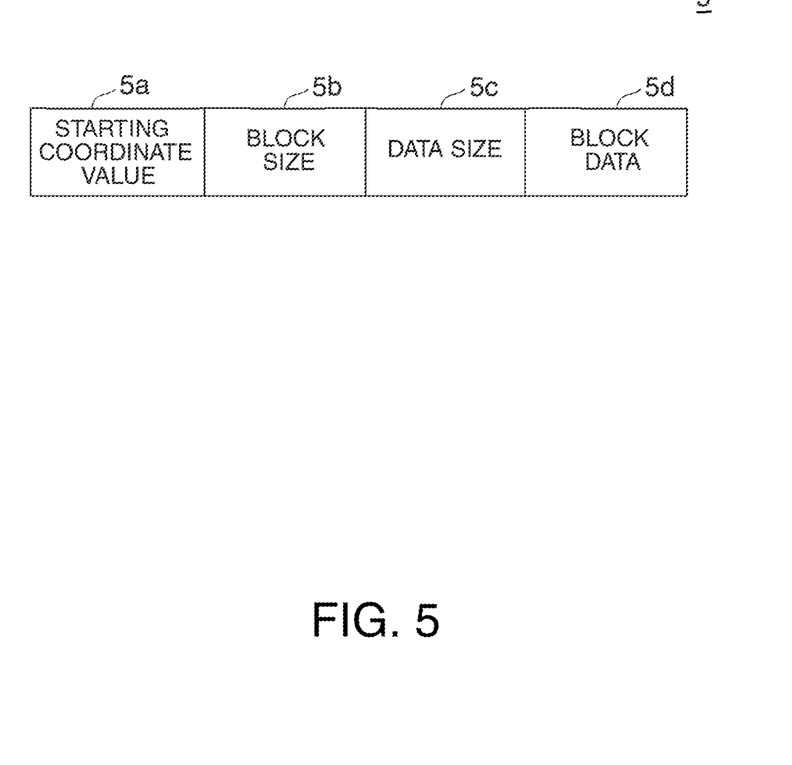
FIG. 5 is a diagram showing a data configuration of transfer block data formed in the personal computer.

Maximum data size=Block data $B1a$=Block data $B1c$>Block area $B3$>Block area $B2$>Block data $B1d$>Block data $B1b$>Block data $B1e$>Block data $B1f$ Since the data transfer of the block data shown in FIG. 4 is performed, each of the block data is treated as transfer block data added with the information representing the location in the frame image and the size thereof. FIG. 5 shows the data configuration of the transfer block data formed by the PC 10. In FIG. 5, the transfer block data 5 includes a starting coordinate value 5a, a block size 5b, a data size 5c, and the block data 5d. The starting coordinate value 5a is a starting coordinate value of the block data 5d as the actual block data in the frame image, such as a coordinate value representing the upper left corner of the block shown in FIG. 4. The block size 5b denotes the vertical and lateral sizes of the block such as pixel counts thereof in the respective vertical and horizontal directions. The data size 5c represents the data size of the entire transfer block data 5.

Then, the process, in which the image data and the sound data are transmitted from the PC 10 to the projector 30, and then the projector 30 receiving the data projects and thereby displaying the image, and at the same time, outputs the sound, will be explained. Firstly, the projector system 1 needs to perform an initialization process between the PC 10 and the projector 30. In the initialization process, setting of the transfer mode of the USB communication between the PC 10 and the projector 30 is performed, and in addition, the PC 10 obtains sound output parameters related to the sound output from the projector 30, and then determines the maximum data size of the block data.

Figure 6:
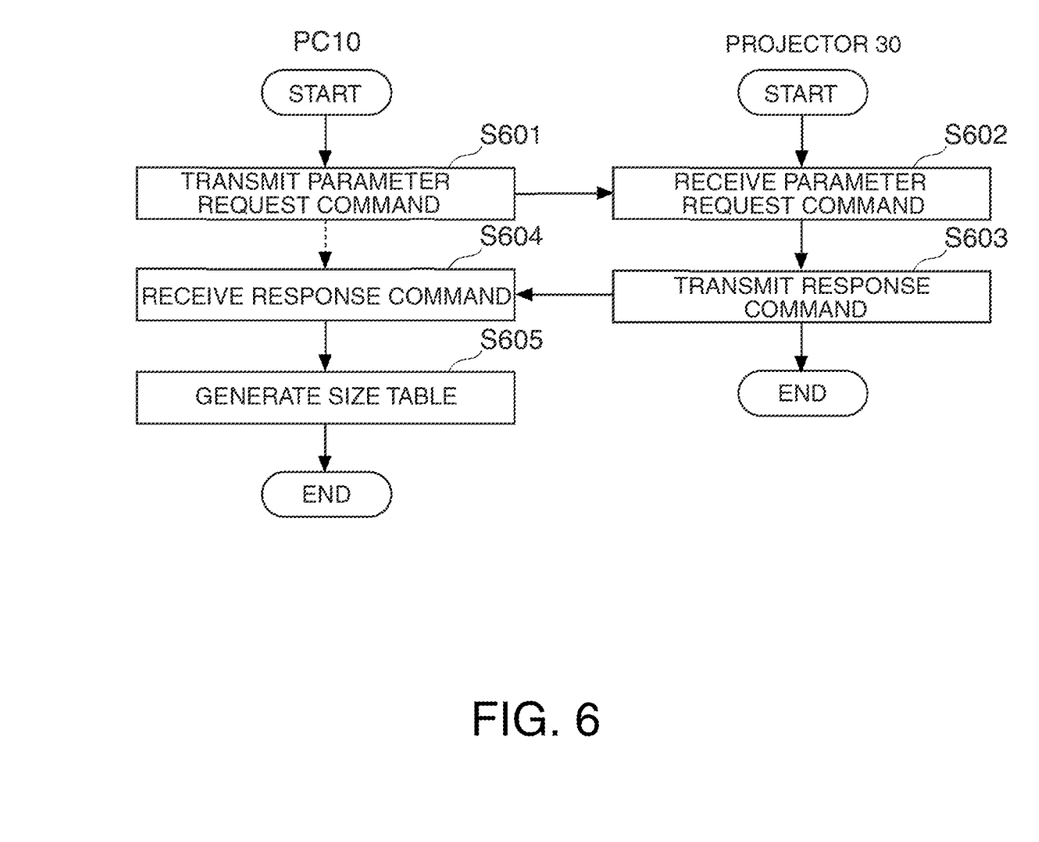
FIG. 6 is a flowchart for explaining an initialization process executed between the personal computer and the projector.

FIG. 6 shows a flowchart of a process of communicating the sound output parameters in particular in the initialization process performed between the PC 10 and the projector 30. In FIG. 6, the control section 11 of the PC 10 transmits a parameter request command for obtaining the sound output parameters the projector 30 has from the communication section 15 (S601). When the communication section 32 of the projector 30 receives the parameter request command (S602), the communication section 32 supplies the control section 31 with the command, and then the control section 31 includes the sound output parameters of the sound data to be processed by the sound processing section 34 in a response command, and transmits the response command from the communication section 32 (S603). When the communication section 15 of the PC 10 receives the response command (S604), the communication section 15 supplies it to the control section 11, and then the control section 11 generates a predetermined size table based on the sound output parameters included in the response command (S605).

Here, the size table generated by the PC 10 based on the sound output parameters obtained from the projector 30 will be explained specifically. It is assumed here that the sound data handled by the projector system 1 is PCM data, and therefore, the sound output parameters obtained by the PC 10 are a sampling frequency F (Hz), a bit count B (bits), and a channel count C (channels). Further, the transmission interval of the sound data in the PC 10 is denoted as T (sec), and the data transfer rate of the USB bus is denoted as R (bps). Still further, the data item count of the size table is denoted as M (an integer equal to or greater than two). In the condition described above, the transmission data size AD (bytes) (a first data amount) of the sound data per cycle, namely the transmission interval T, can be obtained along the formula (1).

$$AD = F \times \frac{B}{8} \times C \times T \qquad (1)$$

Further, the data size TD (bytes) which can be transmitted within the transmission interval T can be obtained along the formula (2).

$$TD = \frac{R}{8} \times T \qquad (2)$$

Therefore, the maximum image data size D (bytes) (a second data amount) which can be transmitted within the transmission interval T can be obtained along the formula (3).

$$D = TD - AD \qquad (3)$$

Figure 7A:
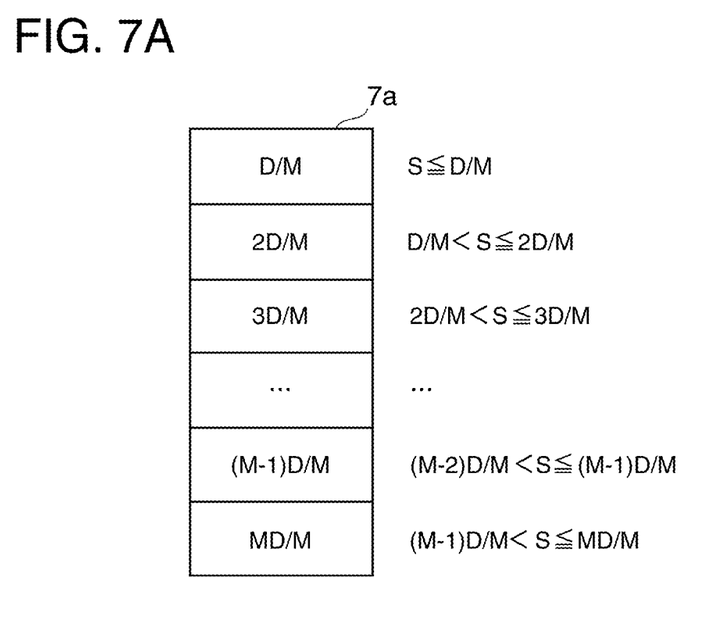
FIGS. 7A and 7B are diagrams showing a data configuration of a size table.

Using the maximum image data size D and the data item count M, D/M, 2D/M, 3D/M, . . . , (M−1)D/M, and MD/M are obtained, and the size table 7a constituted with M data shown in FIG. 7A is generated. In FIG. 7A, the block data with the data sizes S within the ranges, which are described in the right side of the size table 7a for explanations, are made to correlate to the respective items of the size table 7a.

Figure 7B:
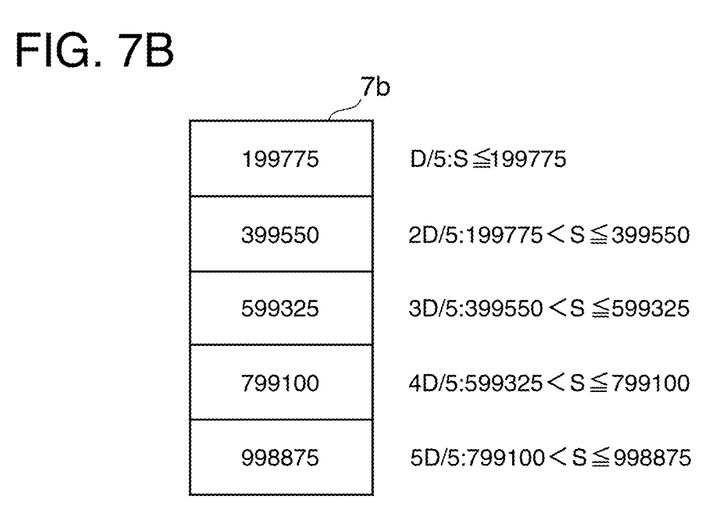

Here, a specific example of the size table generated by the control section 11 will be described. The sound output parameters to be obtained by the PC 10 are assumed to be the sampling frequency F=22.5 kHz, the bit count B=8 bits, and the channel count C=1, the transmission interval T of the sound data in the PC 10 is assumed to be T=50 msec, and the data transfer rate R of the USB bus is assumed to be R=160 Mbps. Further, the data item count M when generating the size table is assumed to be M=5. By the control section 11 of the PC 10 executing the calculation along the formulas (1) through (3) described above, AD=1,125 bytes, TD=1,000,000 bytes, and D=998,875 bytes are obtained, and thus the size table 7b shown in FIG. 7B is generated.

Figure 8:
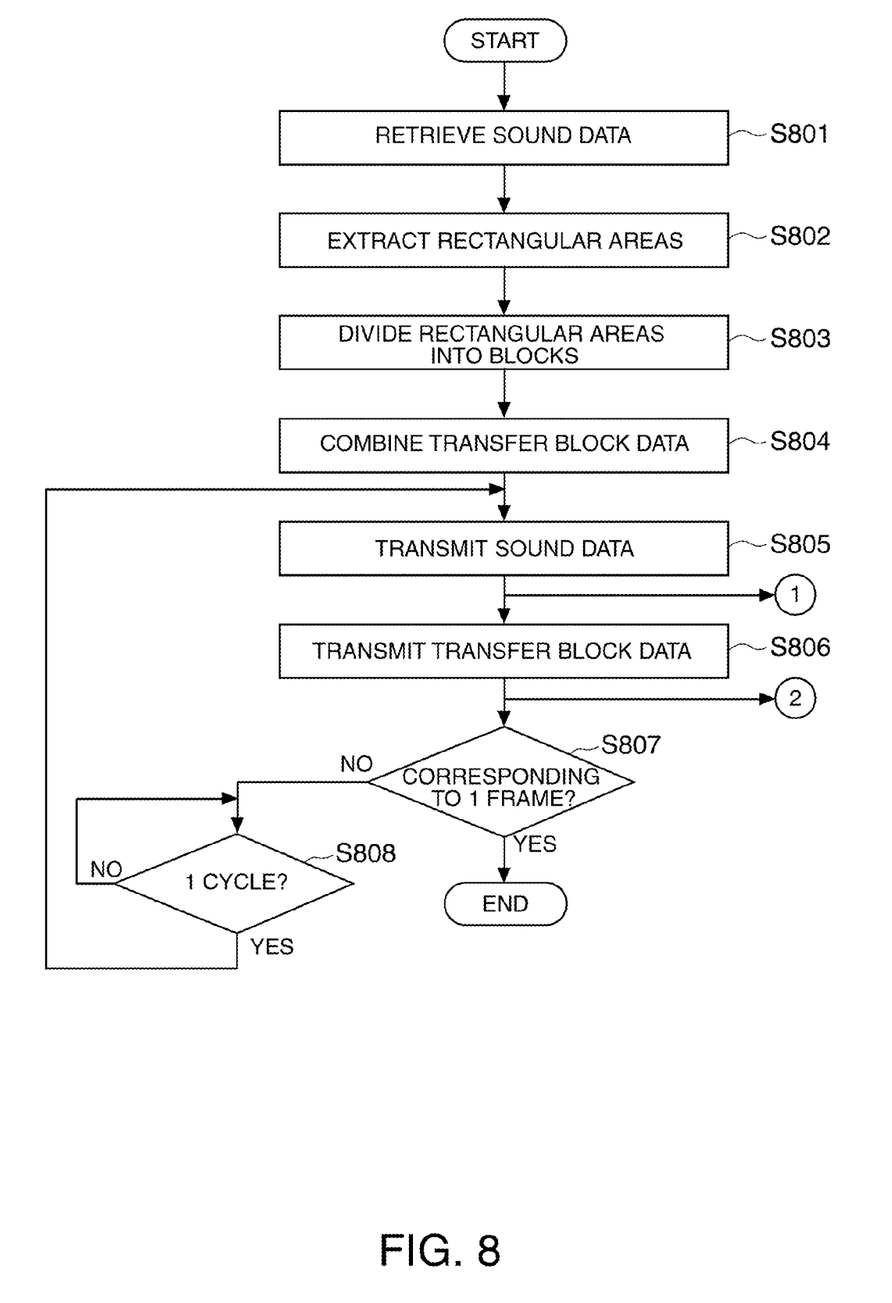
FIG. 8 is a flowchart for explaining a process of the personal computer for transferring the sound data, and the transfer block data corresponding to one frame image.

Then, the process in which the control section 11 of the PC 10 executes the image/sound supplying program, thereby transferring the sound data and the transfer block data corresponding to one frame image while optimizing the data configuration will be explained with reference to the flowchart shown in FIG. 8. In FIG. 8, the control section 11 of the PC 10 retrieves the PCM data, which is encoded based on parameters coincident with the sound output parameters obtained from the projector 30 in the initialization process described above, from the RAM of the storage section 14 or the control section 11 (S801). It should be noted that the control section 11 can be arranged to newly encode the sound data, which is encoded based on parameters different from the sound output parameters obtained from the projector 30, using the sound output parameters obtained from the projector 30.

Subsequently, the control section 11 compares the present frame image stored in the image memory of the display control section 12 with the last frame image stored therein, thereby detecting the data with the difference to extract the rectangular area including the data (S802). For example, the block areas B1, B2, and B3 shown in FIG. 3 are extracted. Subsequently, the control section 11 divides the rectangular area thus extracted into the block data with sizes equal to or smaller than the maximum image data size D (S803). For example, the control section 11 compares the data size S of each of the block areas B1, B2, and B3 with the maximum image data size D, and as shown in FIG. 4, the control section 11 divides the block area B1 with a data size S larger than the maximum image data size D by a square block with a size equal to the maximum image data size D. According to FIG. 4, the block area B1 is divided into the block data B1*b*, B1*d*, B1*e*, and B1*f* besides the block data B1*a* and B1*c* each having the data size S identical to the maximum image data size D. Since the block areas B2 and B3 each have a data size S smaller than the maximum image data size D, the block division is not executed thereon.

Subsequently, the control section 11 optimizes the combinations of the block data based on the size table generated in the initialization process (S804). In other words, in the example shown in FIG. 4, the control section 11 formats each of the six block data B1*a*, B1*b*, B1*c*, B1*d*, B1*e*, and B1*f* obtained by dividing the block area B1, and the block data of the block areas B2 and B3 into the data configuration shown in FIG. 5, and then determines the combinations of the transfer block data based on the size table so that the transfer data size falls within the maximum image data size D.

Specifically, in the example shown in FIG. 4, it is assumed that the data sizes S of the block data B1*a* and B1*c* are 998,875 bytes, the data size S of the block data B1*b* is 580,261 bytes, the data size S of the block data B1*d* is 654,397 bytes, the data size S of the block data B1*e* is 382,456 bytes, the data size S of the block data B1*f* is 180,392 bytes, the data size S of the block area B2 is 773,462 bytes, and the data size S of the block area B3 is 862,464 bytes.

In this case, when using the size table shown in FIG. 7B, the block data B1*f* is correlated with the range of D/5, namely the range satisfying S≤199,755, the block data B1*e* is correlated with the range of 2D/5, namely the range satisfying 199,755<S≤399,550, the block data B1*b* is correlated with the range of 3D/5, namely the range satisfying 399,550<S≤599,325, the block area B2 and the block data B1*d* are correlated with the range of 4D/5, namely the range satisfying 599,325<S≤799,100, and the block data B1*a* and B1*c*, and the block area B3 are correlated with the range of 5D/5, namely the range satisfying 799,100<S≤998,875.

Then, in accordance with the correlations described above, the combinations of the transfer block data are determined so that the size of the data does not exceed the maximum image data size D, and the transfer block data thus combined are stored in the RAM so as to be transmitted in descending order of the data size. The combinations are determined in such a manner that the block data included in the range of D/5 and the block data included in the range of 4D/5 are combined with each other, and the block data included in the range of 2D/5 and the block data included in the range of 3D/5 are combined with each other, for example. Specifically, the block data B1*b* and the block data B1*e* are combined with each other, and the block area B2 and the block data B1*f* are combined with each other, for example.

Subsequently to the process of the step S804, the control section 11 makes the communication section 15 transmit the sound data corresponding to the transmission data size AD out of the sound data retrieved in the process of the step S801 to the projector 30 (S805). Subsequently, the control section 11 makes the communication section 15 transmit the combination of the transfer block data designated to be transferred first out of the combinations of the transfer block data stored in the RAM to the projector 30 (S806).

Figure 9:
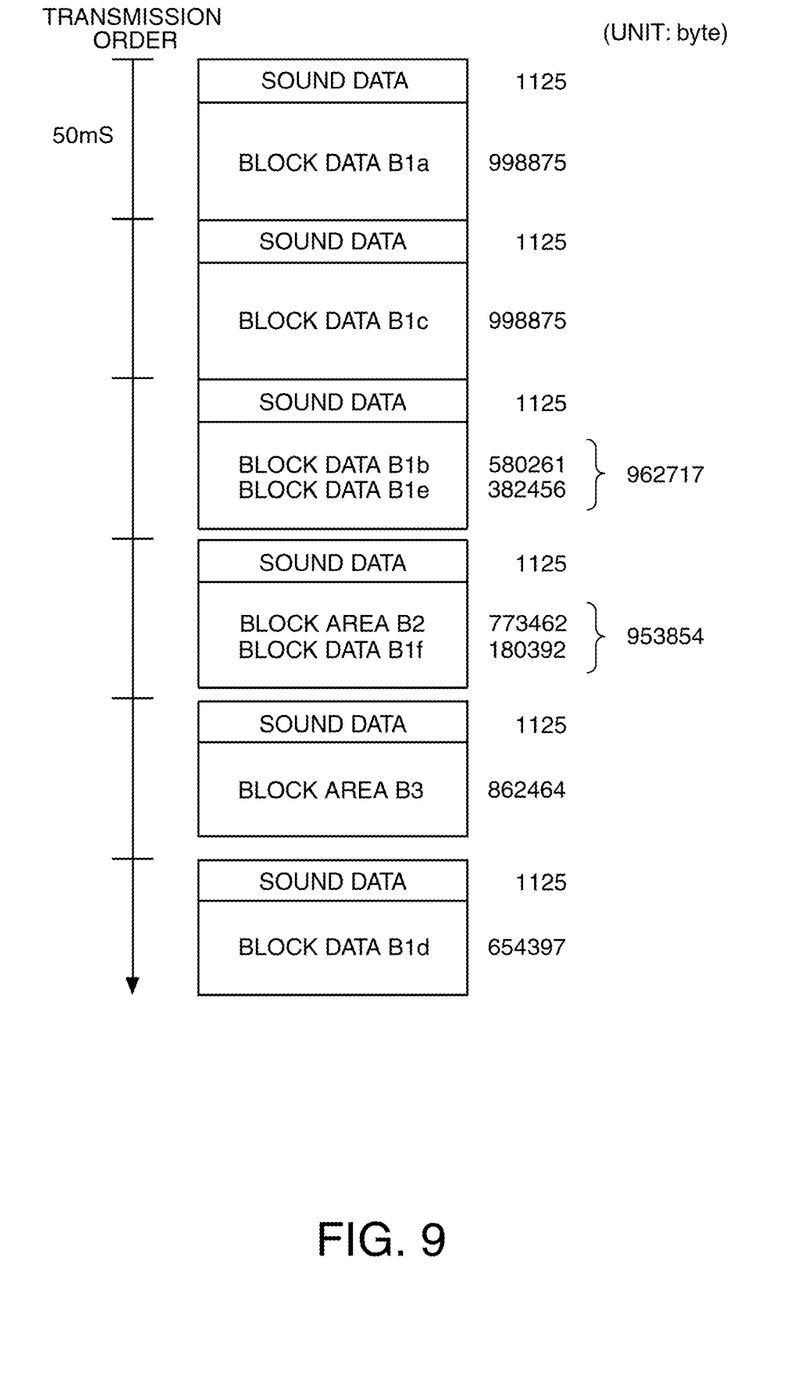
FIG. 9 is a time chart of the case in which the personal computer transfers the sound data and the transfer block data to the projector.

Then, the control section 11 determines whether or not the transmission of the transfer block data corresponding to one frame image has been completed (S807), and if the transfer block data to be transmitted is stored in the RAM (NO in S807), the process proceeds to the process of the step S805 in sync with the transmission interval T (S808). In contrast, if the transmission of the transfer block data corresponding to one frame image has been completed (YES in S807), the process of the flowchart is terminated. According to the process of the flowchart, as in the time chart shown in FIG. 9, for example, the PC 10 transfers the sound data and the transfer block data to the projector 30 in sync with the transmission interval T of the sound data.

Figure 10:
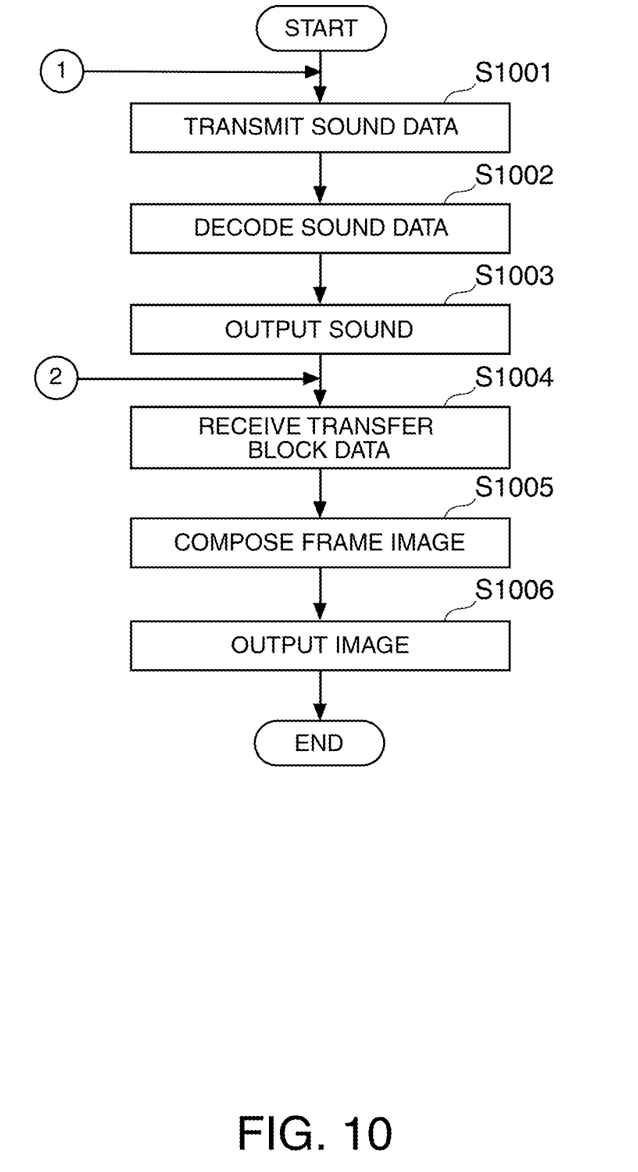
FIG. 10 is a flowchart for explaining a process of the projector for projecting and thereby displaying an image, and at the same time outputting the sound.

Then, the process in which the control section 31 of the projector 30 executes the image/sound receiving program, thereby receiving the sound data and the transfer block data corresponding to one frame image to display the image by projection and to output the sound will be explained with reference to the flowchart shown in FIG. 10. In FIG. 10, the projector 30 receives the sound data corresponding to the transmission data size AD, which is transmitted by the process of the step S805 of the PC 10, with the communication section 32, and then supplies it to the control section 31 (S1001). Subsequently, the control section 31 stores the sound data into the RAM once, and then retrieves the sound data from the RAM storing the sound data to supply it to the sound processing section 34. Then, the sound processing section 34 decodes the sound data to convert it into the sound signal, and then supplies it to the sound output section 37 (S1002). Subsequently, the sound output section 37 amplifies the sound signal with the amplifier, and then outputs the sound from the speaker in an amplified manner (S1003).

Further, the projector 30 receives the transfer block data, which is transmitted by the process of the step S806 of the PC 10, with the communication section 32, and then supplies it to the control section 31 (S1004). Subsequently, the control section 31 stores the transfer block data into the RAM once, and then retrieves each transfer block data from the RAM storing the transfer block data to supply it to the image processing section 33. Subsequently, the image processing section 33 composes the frame image from the block data 5d based on the starting coordinate value 5a and the block size 5b included in the transfer block data, and then supplies the image projection section 35 with the frame image (S1005). Then, the image projection section 35 projects the frame image (S1006).

As described above, according to the present embodiment, in the projector system having the PC and the projector connected to each other via the USB cable, since the PC transfers the sound data to the projector at regular intervals, and the projector receives the sound data at the regular intervals to perform the decoding process, the projector can stably output the sound without causing the sound interruption. In addition thereto, since the PC can transfer the transfer block data including the data with the difference in the frame image with efficiency, the data transfer with extremely high transfer efficiency can be performed as a whole projector system.

It should be noted that although the respective communication sections of the PC and the projector are set in the transfer mode compliant with either one of the USB 1.1 standard and the USB 2.0 standard, and operate in that transfer mode, it is also possible to arrange that the PC treats the block data as the transfer block data of the non-compressed data when the respective communication sections are set in the transfer mode compliant with the USB 2.0 standard, and the control section of the PC compresses the block data by the JPEG method, and treats the JPEG data as the transfer block data when the respective communication sections are set in the transfer mode compliant with the USB 1.1 standard. In this case, it is possible to arrange that the projector executes a process of executing decompression process on the JPEG data in the image processing section to extract it into the frame image when the communication sections are set in the transfer mode compliant with the USB 1.1 standard.

Further, the connection interface between the PC and the projector is not limited to the USB, but can be a serial bus compliant with, for example, the IEEE 1394 standard.

Although the embodiment of the invention is described hereinabove in detail, the specific configuration is not limited to the embodiment described above, but the design within the scope or the spirit of the invention is also included therein.

What is claimed is:

1. An image and sound supply device adapted to repeatedly supply sound data and image data in such a manner that intervals between transmission start points of the sound data become constant, comprising:
    a block data extraction section adapted to extract first block data including data with a difference between the two frame images with a time lag;
    a block data dividing section adapted to divide the first block data into second block data with a data amount equal to or smaller than a second data amount when a data amount of the first block data extracted is larger than the second data amount;
    a sound data output section adapted to output the sound data with a first data amount; and
    a block data output section adapted to output the first block data subsequently to output of the sound data from the sound data output section when the block data dividing section skips dividing the first block data, and to output the second block data as much as a data amount equal to or smaller than the second data amount subsequently to the output of the sound data from the sound data output section when the block data dividing section divides the first block data, wherein the first data amount is a data amount of the sound data to be transmitted at a time, and the second data amount is a maximum data amount of the image data to be transmitted subsequently to the sound data.

2. The image and sound supply device according to claim 1, wherein
    the block data dividing section divides the first block data into a plurality of the second block data respectively having data amounts each of which is equal to or smaller than the second data amount and which are different in stages when the data amount of the first block data is larger than the second data amount, and
    the block data output section outputs the first block data subsequently to the output of the sound data from the sound data output section when the block data dividing section skips dividing the first block data, and combines some or all of the plurality of the second block data so that a total data amount becomes equal to or smaller than the second data amount, and outputs the second block data combined subsequently to the output of the sound data from the sound data output section when the block data dividing section divides the first block data into the plurality of the second block data.

3. An image and sound supply system comprising the image and sound supply device in accordance with claim 1 and an image and sound output device connected to the image and sound supply device via a data bus, wherein the image and sound output device includes
- a sound data receiving section adapted to receive the sound data supplied from the image/sound supply device,
- a sound output section adapted to convert the sound data received into a sound signal, and to perform sound output,
- a frame image storage section adapted to store the frame image,
- a block data receiving section adapted to receive the block data output from the image/sound supply device,
- a block data overwrite control section adapted to overwrite the block data received on the frame image stored in the frame image storage section, and
- a projection output section adapted to retrieve the frame image stored in the frame image storage section in an overwriting manner, and to perform projection output.

4. The image and sound supply system according to claim 3, wherein in the image and sound supply devices,
- the block data dividing section divides the first block data into a plurality of the second block data respectively having data amounts each of which is equal to or smaller than the second data amount and which are different in stages when the data amount of the first block data is larger than the second data amount, and
- the block data output section outputs the first block data as the block data subsequently to the output of the sound data from the sound data output section when the block data dividing section skips dividing the first block data, and combines some or all of the plurality of the second block data so that a total data amount becomes equal to or smaller than the second data amount, and outputs the second block data combined as the block data subsequently to the output of the sound data from the sound data output section when the block data dividing section divides the first block data into the plurality of the second block data.

5. An image and sound supply method adapted to repeatedly supply sound data and image data in such a manner that intervals between transmission start points of the sound data become constant, comprising:
- (a) extracting a first block data including data with a difference between two frame images with a time lag;
- (b) dividing the first block data into second block data with a data amount equal to or smaller than a second data amount when a data amount of the first block data extracted is larger than the second data amount;
- (c) outputting the sound data with a first data amount; and
- (d) outputting the first block data subsequently to output of the sound data in step (c) when dividing of the first block data is skipped in step (b), and outputting the second block data as much as a data amount equal to or smaller than the second data amount subsequently to the output of the sound data in step (c) when the first block data is divided in step (b), wherein the first data amount is a data amount of the sound data to be transmitted at a time, and the second data amount is a maximum data amount of the image data to be transmitted subsequently to the sound data.

6. The image and sound supply method according to claim 5, wherein
- in step (b), the first block data is divided into a plurality of the second block data respectively having data amounts each of which is equal to or smaller than the second data amount and which are different in stages when the data amount of the first block data is larger than the second data amount, and
- in step (d), the first block data is output subsequently to the output of the sound data in step (c) when dividing of the first block data is skipped in step (b), and some or all of the plurality of the second block data is combined so that a total data amount becomes equal to or smaller than the second data amount, and the second block data combined is output subsequently to the output of the sound data in step (c) when the first block data is divided into the plurality of the second block data in step (b).

7. At least one non-transitory computer readable storage medium embodying an image and sound supplying program for making a computer execute a process of repeatedly supplying sound data and image data in such a manner that intervals between transmission start points of the sound data become constant, the process comprising:
- (a) extracting a first block data including data with a difference between two frame images with a time lag;
- (b) dividing the first block data into second block data with a data amount equal to or smaller than a second data amount when a data amount of the first block data extracted is larger than the second data amount;
- (c) outputting the sound data with a first data amount; and
- (d) outputting the first block data subsequently to output of the sound data in step (c) when dividing of the first block data is skipped in step (b), and outputting the second block data as much as a data amount equal to or smaller than the second data amount subsequently to the output of the sound data in step (c) when the first block data is divided in step (b), wherein the first data amount is a data amount of the sound data to be transmitted at a time, and the second data amount is a maximum data amount of the image data to be transmitted subsequently to the sound data.

8. The at least one non-transitory computer readable storage medium embodying the image and sound supplying program according to claim 7, wherein
- in step (b), the first block data is divided into a plurality of the second block data respectively having data amounts each of which is equal to or smaller than the second data amount and which are different in stages when the data amount of the first block data is larger than the second data amount, and
- in step (d), the first block data is output subsequently to the output of the sound data in step (c) when dividing of the first block data is skipped in step (b), and some or all of the plurality of the second block data is combined so that a total data amount becomes equal to or smaller than the second data amount, and the second block data combined is output subsequently to the output of the sound data in step (c) when the first block data is divided into the plurality of the second block data in step (b).

* * * * *